US009975454B2

(12) United States Patent
Cailleteau

(10) Patent No.: US 9,975,454 B2
(45) Date of Patent: May 22, 2018

(54) COMPACT SEAT KINEMATIC

(71) Applicant: Zodiac Seats France, Issoudun (FR)

(72) Inventor: Jeremy Cailleteau, St Aout (FR)

(73) Assignee: Zodiac Seats France, Issoudun (FR)

( * ) Notice: Subject to any disclaimer, the term of this patent is extended or adjusted under 35 U.S.C. 154(b) by 166 days.

(21) Appl. No.: 14/761,662

(22) PCT Filed: Jan. 23, 2014

(86) PCT No.: PCT/IB2014/058506
§ 371 (c)(1),
(2) Date: Jul. 17, 2015

(87) PCT Pub. No.: WO2014/115106
PCT Pub. Date: Jul. 31, 2014

(65) Prior Publication Data
US 2015/0352983 A1    Dec. 10, 2015

Related U.S. Application Data

(60) Provisional application No. 61/755,549, filed on Jan. 23, 2013, provisional application No. 61/755,552, filed on Jan. 23, 2013.

(51) Int. Cl.
*B60N 2/06* (2006.01)
*B60N 2/02* (2006.01)
(Continued)

(52) U.S. Cl.
CPC ........... *B60N 2/067* (2013.01); *B60N 2/0232* (2013.01); *B60N 2/164* (2013.01); *B60N 2/1615* (2013.01);
(Continued)

(58) Field of Classification Search
CPC ........ B60N 2/067; B60N 2/06; B60N 2/0232; B60N 2/2209; B64D 11/0641
(Continued)

(56) References Cited

U.S. PATENT DOCUMENTS 4,721,337 A * 1/1988 Tomita ................... B60N 2/067
248/393
4,756,502 A    7/1988 Egan
(Continued)

FOREIGN PATENT DOCUMENTS

CN    101010237 A    8/2007
EP    0957025 A2    11/1999
(Continued)

OTHER PUBLICATIONS

International Patent Application No. PCT/IB2014/058506, International Preliminary Report on Patentability dated Aug. 6, 2015.
(Continued)

*Primary Examiner* — Milton Nelson, Jr.
(74) *Attorney, Agent, or Firm* — Kilpatrick Townsend & Stockton LLP; Dean W. Russell; Davidson G. Lucas

(57) ABSTRACT

The present invention generally relates to passenger seats. Some embodiments are related to a compact seat kinematic for moving a seat from a retracted position to an extended position. In some embodiments an intermediate component may be provided for coupling between a lower frame and an upper seat portion. The intermediate component (230) may translate in a forward direction relative to the lower frame and may translate the upper seat portion in the forward direction relative to the intermediate component. Other embodiments relate to a seat backrest recline system that may provide constant ratio of speed and force and may forgo the need for calibration.

11 Claims, 12 Drawing Sheets

(51) Int. Cl.
B64D 11/06 (2006.01)
B60N 2/16 (2006.01)
B60N 2/22 (2006.01)
B60N 2/24 (2006.01)

(52) U.S. Cl.
CPC ........... *B60N 2/2209* (2013.01); *B60N 2/242* (2013.01); *B64D 11/06* (2013.01); *B64D 11/064* (2014.12); *B64D 11/0641* (2014.12); *B64D 11/0696* (2013.01)

(58) Field of Classification Search
USPC ..................................................... 297/344.1
See application file for complete search history.

(56) References Cited

U.S. PATENT DOCUMENTS

| | | | | |
|---|---|---|---|---|
| 4,944,555 | A | * | 7/1990 | Brusasco ............. B60N 2/0232 297/330 |
| 5,462,337 | A | * | 10/1995 | Yamakami ........... B60N 2/0232 192/48.1 |
| 5,950,978 | A | * | 9/1999 | Eguchi .................. B60N 2/067 248/429 |

FOREIGN PATENT DOCUMENTS

| | | |
|---|---|---|
| EP | 1074468 A2 | 2/2001 |
| GB | 2306880 A | 5/1997 |
| WO | 2008/122761 A1 | 10/2008 |
| WO | 2010/116415 A1 | 10/2010 |
| WO | 2011/135651 A1 | 11/2011 |

OTHER PUBLICATIONS

Chinese Patent Application No. 201480017687.8, Examination and Search Report (and English translation) dated Jun. 2, 2016.
International Patent Application No. PCT/IB2014/058506, Invitation to Pay Additional Fees and, Where Applicable, Protest Fee dated Apr. 17, 2014.
International Patent Application No. PCT/IB2014/058506, International Search Report and Written Opinion dated Jul. 7, 2014.

* cited by examiner

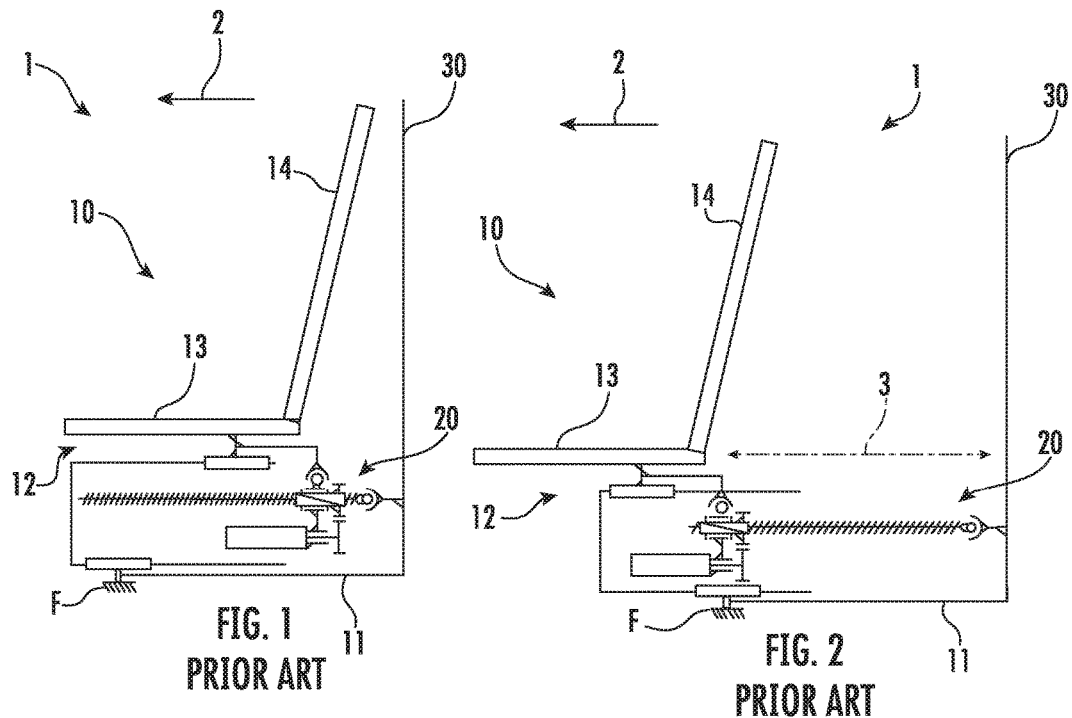
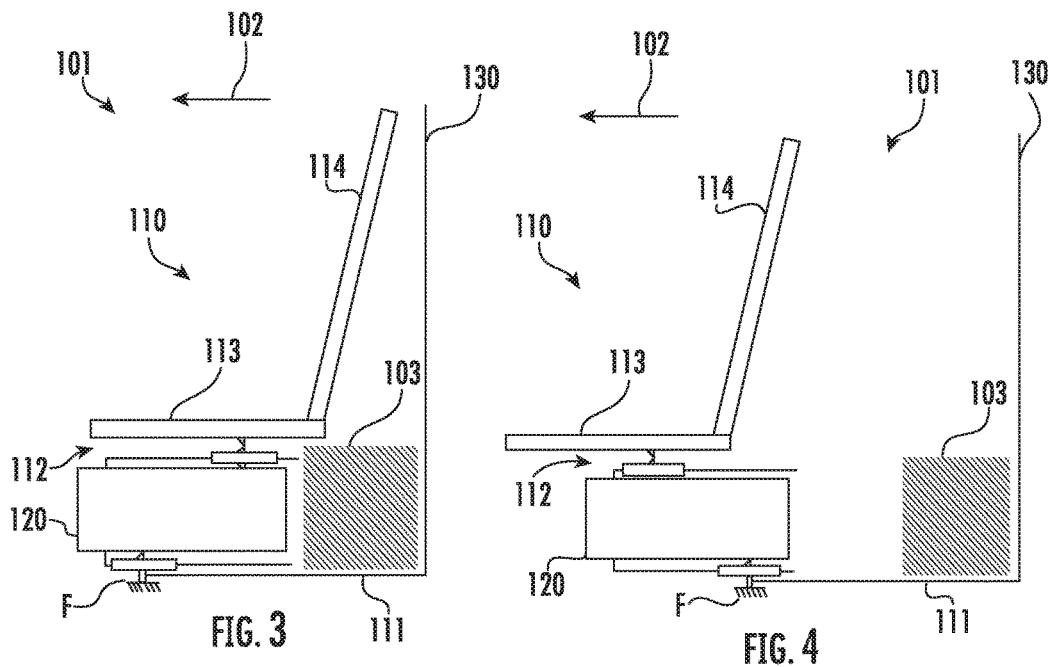

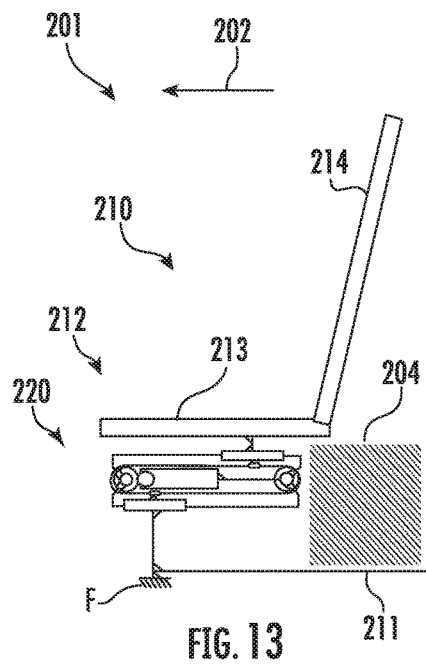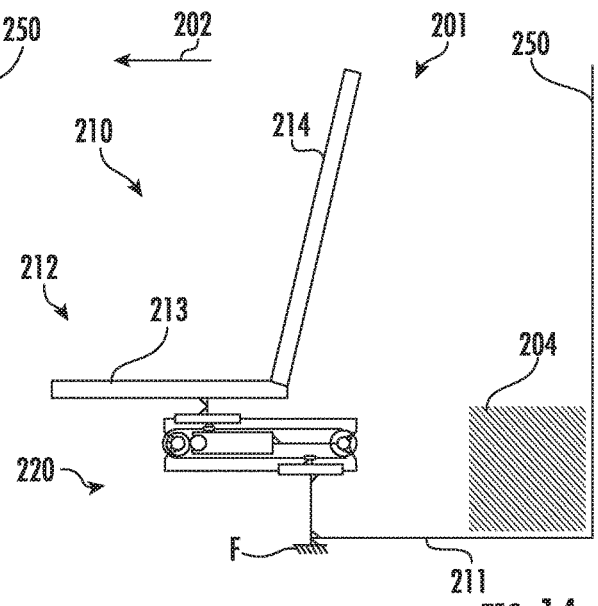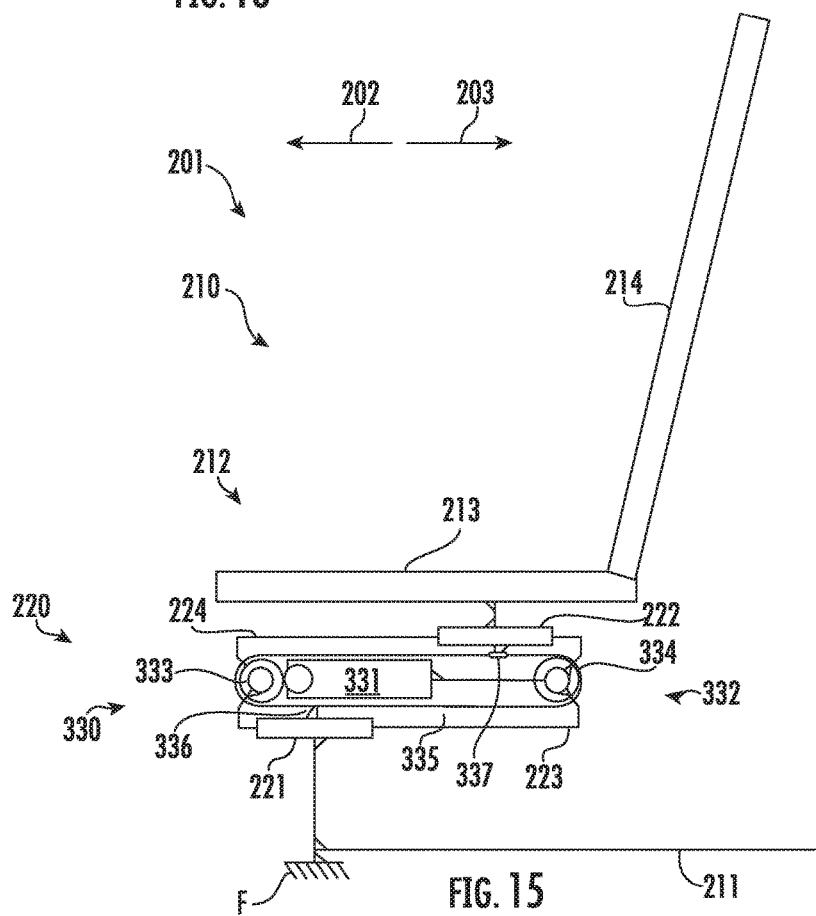

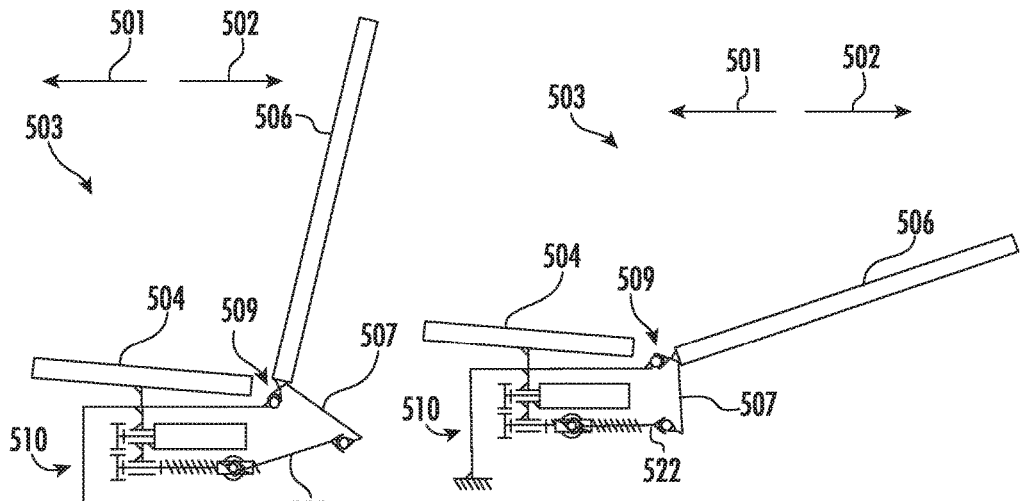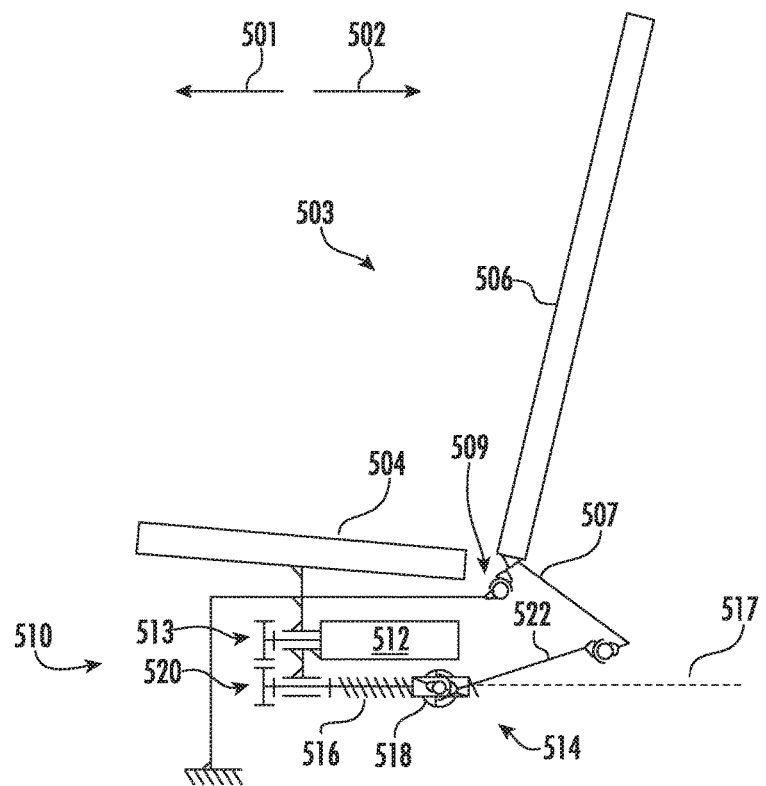

COMPACT SEAT KINEMATIC

CROSS REFERENCE TO RELATED APPLICATIONS

This application is the U.S. national phase entry of International Application No. PCT/IB2014/058506 filed on Jan. 23, 2014, which application claims priority to and the benefit of U.S. Provisional Application No. 61/755,549 filed on Jan. 23, 2013 and U.S. Provisional Application No. 61/755,552 filed on Jan. 23, 2013, the contents of which are incorporated herein by reference.

BACKGROUND OF THE INVENTION

The present invention generally relates to passenger seats. More specifically, embodiments of the present invention relate to systems and methods for offering a compact seat with a relaxed and/or bed position and backrest reclining systems for use with a passenger seat in a passenger cabin.

Recent business class seats offer a reclining backrest to accommodate any comfort position in between the most upright position and a bed position (or substantially horizontal position). Additionally some passenger seat designs include privacy shells which allow passengers to adjust his own seat without interfering with the living space of a passenger seated directly behind. To optimize the living space of each passenger, the seat in the sitting position generally located close to the privacy shell. When transitioning to a relaxed or bed position, the seat must move forward to accommodate the backrest rotation from an upright position to the relaxed or bed position. While many passenger seat designs have been proposed, there are areas for further improvement.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In some embodiments a seat kinematic is provided for use with a seat having a lower frame portion and an upper seat portion. The seat may be moveable between a retracted position and an extended position. The seat kinematic may be configured to translate the upper seat portion relative to the lower frame portion when the seat transitions between the retracted position and the extended position. The seat kinematic may include an actuator system having a first linear actuator, a second linear actuator, and at least one motor configured to drive the first linear actuator and the second linear actuator. The first linear actuator and the second linear actuator may be arranged parallel to each other. The actuator system may be configured to couple the lower frame of the seat to the upper seat portion of the seat and may be configured to move the seat between the retracted position to the extended position. The actuator system may move the seat to the extended position by 1) translating the actuator system in a first direction relative to the lower frame by driving the first linear actuator using the at least one motor; and 2) translating the upper seat portion in the first direction relative to the actuator system by driving the second linear actuator using the at least one motor.

Optionally, the at least one motor may be configured to simultaneously drive the first linear actuator and the second linear actuator such that the actuator system translates in the first direction relative to the lower frame portion simultaneously as the upper seat portion translates in the first direction relative to the actuator system. The actuator system may translate at a first speed in the first direction relative to the lower frame portion and the upper seat portion may translate at a second speed in the first direction relative to the lower frame portion—the second speed being greater than the first speed. The second speed may be at least twice that of the first speed.

In some embodiments, the first linear actuator may couple with the lower frame portion of the seat and the second linear actuator may couple with the upper seat portion of the seat. In some embodiments, the first linear actuator may comprise a first ball screw and a first ball nut, with the first ball nut configured to rigidly couple with the lower frame portion of the seat. The second linear actuator may comprise a second ball screw and a second ball nut, with the second ball nut configured to rigidly couple with the upper seat portion of the seat. Optionally, the first ball screw and the second ball screw may have similar lengths.

The first ball screw may comprise a gearwheel coupled to a first end of the first ball screw and the second ball may comprise a gearwheel coupled to a first end of the second ball screw. The gearwheels of the first and second ball screws may be coupled together and configured to be driven simultaneously by a gearwheel of the at least one motor.

In some embodiments of the invention, a seat is provided that includes an embodiment of the seat kinematic described above. The upper seat portion of the seat may include a seat pan pivotally coupled relative to a seat backrest. For example, in some embodiments, the seat pan may be pivotally coupled relative to a seat backrest by directly coupling to the seat backrest with a pivot joint. In other embodiments, the seat pan may be pivotally coupled relative to a seat backrest by being indirectly coupled with one another (e.g., the seat pan and the backrest could be coupled to an intermediate component of the upper seat portion). In embodiments where the backrest and the seat pan are both attached to an intermediate upper portion of the seat, but are not coupled together, their motions may be independent from one another and independently controlled. In such an embodiment, two or more motors may be used to independently control the motion of the seat pan and the seat backrest. The seat kinematic may include a track coupled to the actuator system and the seat pan may couple to the track with a roller. The roller may be configured to roll along the track as the upper seat portion translates relative to the actuator system. The movement of the roller along the track may adjust an angle of the seat pan as the upper seat portion translates relative to the actuator system.

In some embodiments, a seat may be provided that includes an embodiment of the seat kinematic described above. The upper seat portion of the seat may include a seat pan and a seat backrest. An angle of the seat pan relative the seat kinematic may be controlled through a linkage between the seat pan and the seat kinematic. For example, a linkage may comprise a first end and a second end. The first end may be pivotally coupled to the seat pan and the second end may be pivotally coupled to a portion of the seat kinematic. As the upper seat portion moves relative to the seat kinematic, the first end of the link may rotate about the second end of the link and may thus change the angle of the seat pan during the relative movement between the components.

Optionally, when the seat is in the retracted position, the first ball nut may be adjacent the first end of the first ball screw and the second ball nut may be adjacent a second end of the second ball screw.

In further embodiments of the invention, a seat may be provided that includes an embodiment of the seat kinematic. The upper seat portion of the seat may include a seat pan and a seat backrest. The seat may further include a backrest recline system. The backrest recline system may include at least one motor coupled to a linear actuator. The at least one motor and the linear actuator may be coupled to the seat pan. A link having a first end and a second end and an elongate body therebetween may pivotally couple to the linear actuator at its first end and may couple to the seat backrest at its second end.

In some embodiments, a seat kinematic is provided for use with a seat having a lower frame portion and an upper seat portion. The seat may be moveable between a retracted position and an extended position. The seat kinematic may be configured to translate the upper seat portion relative to the lower frame portion when the seat transitions between the retracted position and the extended position. The seat kinematic may include an actuator system having a pulley system and at least one motor configured to drive the pulley system. The pulley system may include a front pulley, a back pulley and a belt for coupling the front pulley and the back pulley. A first portion of the belt may be configured to couple to the lower frame portion of the seat and a second portion of the belt may be configured to couple to the upper seat portion of the seat. The actuator system may be configured to move the seat between the retracted position to the extended position by: 1) translating the actuator system in a first direction relative to the lower frame by driving the pulley system using the at least one motor; and 2) simultaneously translating the upper seat portion in the first direction relative to the actuator system using the pulley system. The seat may include a backrest recline system having at least one motor coupled to a linear actuator, the at least one motor and the linear actuator coupled to the seat pan. A link having a first end and a second end and an elongate body therebetween may be included. The first end of the link may pivotally couple to the linear actuator and the second end of the link may couple to the seat backrest. Optionally, the seat kinematic further comprises a track coupled to the actuator system and the seat pan may couple to the track with a roller. The roller may be configured to roll along the track as the upper seat portion translates relative to the actuator system and adjust an angle of the seat pan as the roller rolls along the track when the upper seat portion translates relative to the actuator system.

Some embodiments provide a backrest recline system for use with a seat having a seat pan and a seat backrest. The backrest recline system may be configured to move the seat backrest between an upright position and a relaxed or bed position. The backrest recline system may include at least one motor coupled to a linear actuator. The at least one motor and the linear actuator may be configured to couple to the seat pan. A link having a first end and a second end and an elongate body therebetween may couple to the linear actuator with the first end of the link and may be configured to be pushed and pulled with actuation of the linear actuator. The second end of the link may be configured to be coupled to the seat backrest.

Optionally, the linear actuator comprises a ball screw and a corresponding ball nut configured to translate along the ball screw with the rotation of the ball screw. The link may be coupled with the ball nut of the linear actuator. The link may be pivotally coupled with the ball nut. The link may be partially hollow so as to accommodate the ball screw when the ball nut pulls the link in a forward direction relative to the ball screw.

In some embodiments of the invention, a seat comprising an embodiment of the backrest recline system is provided. The ball screw may rotate about an axis of rotation and the link may be at an angle with the axis of rotation of the ball screw when the seat is in the upright position. The link may be aligned along the axis of rotation of the ball screw when the seat is in the relaxed or bed position. Optionally, the seat backrest includes a projection and the second end of the link couples with the projection at a pivot point. The pivot point between the link and the projection may be lower than a pivot point between of the seat backrest.

The invention will be better understood on reading the following description and examining the figures that accompany it. These figures are provided by way of illustration only and are in no way limiting on the invention.

BRIEF DESCRIPTION OF THE DRAWINGS

FIG. 1 illustrates a prior seat kinematic system when the seat is in a retracted position;

FIG. 2 illustrates the prior seat kinematic system when the seat is in an extended position;

FIG. 3 shows a simplified embodiment of a seat kinematic system when a seat is in a retracted position according to some embodiments of the invention;

FIG. 4 shows the simplified embodiment of the seat kinematic system of FIG. 3 when the seat is in an extended position according to some embodiments of the invention;

FIG. 13 shows a design schematic of an exemplary seat kinematic system when a seat is in a retracted position according to some embodiments of the invention;

FIG. 14 shows the design schematic of the exemplary seat kinematic system of FIG. 13 when the seat is in an extended position according to some embodiments of the invention;

FIG. 15 shows the design schematic details of the exemplary seat kinematic system of FIG. 13 and FIG. 14;

FIG. 19 shows a design schematic of an exemplary backrest recline system when the backrest is in an upright position according to some embodiments of the invention;

FIG. 20 shows the design schematic of the exemplary backrest recline system of FIG. 19 when the backrest is in the relaxed/bed position according to some embodiments of the invention;

FIG. 21 shows the design schematic details of the exemplary seat kinematic system of FIG. 19 and FIG. 20;

DETAILED DESCRIPTION

Figure 5:
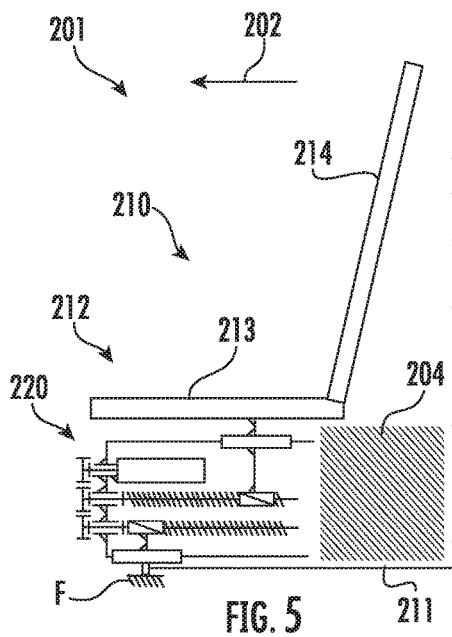
FIG. 5 shows a design schematic of an exemplary seat kinematic system when a seat is in a retracted position according to some embodiments of the invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Some embodiments of the present invention are related to passenger seat designs that may be moveable between an retracted position and an extended position and/or between a sitting/upright position and a bed/relaxed position. Optionally, the relaxed position may be a seat position where the backrest angle could be between 30° to 75° from vertical and the seat pan angle could be between 0° to 25° from horizontal. In some embodiments, the bed position may be at an angle around 10° to 13°, a quasi-horizontal position or a horizontal position. Typically, these types of passenger seats may be offered as business class seats in an aircraft passenger cabin. In some passenger seat designs, a privacy shell may be provided for each passenger seat, thus allowing the passenger to adjust his/her own seat, without interfering with the living space of the passenger seated adjacent to or behind the passenger. To optimize space within each passenger seat area, the passenger seat is generally positioned close to the privacy shell when in the upright position. When transitioning to the bed position, the seat translates or slides forward from a retracted position to an extended position relative to the privacy shell so as to provide additional space for accommodating the seat backrest rotation from the upright position down to the relaxed/bed position. Optionally, the horizontal translation/sliding of the seat (i.e., tracking) may be simultaneous with the rotation of the seat backrest from the upright position to the relaxed or bed position. While embodiments of the present invention are generally described with respect to passenger seat assemblies for use in aircraft passenger cabins, it should be understood that the embodiments disclosed herein are equally applicable for use in other passenger cabins such as car, bus, train, or boat passenger cabins.

FIG. 1 and FIG. 2 show a prior seat kinematic for seat tracking. FIG. 1 illustrates the system 1 when the seat 10 is in a retracted position and FIG. 2 illustrates the system 1 when the seat 10 is in an extended position. The system 1 includes a seat 10, linear actuator 20, and a privacy wall 30. The seat 10 may include a lower frame 11 and an upper seat portion 12 defined by a seat pan 13 and a seat backrest 14 coupled with the seat pan 13, directly or indirectly via an intermediate component. Generally the lower frame 11 is fixed to the passenger cabin floor F and the upper seat portion 12 may translate relative to the lower frame 11 when converting the seat 10 from an retracted position (and/or upright position) to an extended position (and/or a relaxed/bed position). The upper seat portion 12 may be moved forward in direction 2 so as to provide space 3 between the seat 10 and the privacy wall 30 for reclining the seat backrest 14 of seat 10 from the upright position to a relaxed or bed position (not shown). The linear actuator 20 couples to a portion of seat 10 to the privacy wall 30 and is configured to translate the upper seat portion 12 of seat 10 from the retracted position, illustrated in FIG. 1, to an extended position, shown in FIG. 2. As can be seen in FIGS. 1 and 2, a length of the linear actuator 20 may be longer than the tracking of the seat. Thus, the overall footprint of the seat kinematic is comparable to the tracking needs.

In contrast to the device illustrated in FIG. 1 and FIG. 2, some embodiments of the present invention are related to new seat kinematics which offer a compacted design. This may provide additional free space within a passenger cabin. The additional free space may be used, for example, to position or store any other seat unit component, such as electronic boxes. Alternatively, the additional free space may provide additional storage space so as to increase the storage capacity in the passenger cabin or may be used to provide additional space for a passenger foot well for the passenger seated directly behind the compact seat assembly.

FIG. 3 and FIG. 4 show a simplified illustration of an exemplary embodiment according to some embodiments of the present invention. FIG. 3 illustrates the system 101 when the seat 110 is in a retracted position and FIG. 4 illustrates the system 101 when the seat 110 is in an extended position. The illustrated system 101 includes a seat 110, an intermediate component 120, and a privacy wall 130. The seat 110 includes a lower frame portion 111 and an upper seat portion 112 including a seat pan 113 and a seat backrest 114 coupled with the seat pan 113, directly or indirectly via an intermediate component. The intermediate component 120 is positioned between the lower frame portion 111 and the upper seat portion 112. The lower frame 111 may be fixed to the passenger cabin floor and the upper seat portion 112 may translate relative to the lower frame 111 when tracking seat 110 moves between the retracted position and the extended position. In the compact design illustrated in FIG. 3 and FIG. 4, the intermediate component 120 slideably couples to lower frame portion 111 and slides forward in direction 102 relative to lower frame portion 111 when the seat 110 tracks forward from the retracted position to the extended position. Further, the upper seat portion 112 slideably couples with intermediate component 120 and slides forward in direction 102 relative to intermediate component 120 when the seat 110 tracks forward from the retracted position to the extended position. In some embodiments, the sliding translation between the intermediate component 120 and the lower frame 111 and the sliding translation between the upper seat portion 112 and the intermediate component may occur simultaneously. Accordingly, in some embodiments, the travel and speed of the intermediate component 120 relative to the lower frame 111 may be less than the tracking and the speed of the upper seat portion 112 relative to the lower frame 111 as the upper seat portion 112 is translated to the extended position illustrated in FIG. 4. Further, the intermediate component 120 may have a footprint significantly smaller compared to the footprint of the actuator 20 illustrated in FIG. 1 and FIG. 2. The shaded region 103 in FIG. 3 and FIG. 4 illustrate possible space saving compared to the system 1 illustrated in FIG. 1 and FIG. 2. As discussed above, the compact design of system 101 and the space saved 103 may have many advantages. The additional space 103 may be used for positioning other seat components, additional passenger storage space, additional passenger footwell space for the passenger seated directly behind, etc. While the components of the system 101 are described as sliding relative to one another, it should be understood that the components may slide relative to one another using one or more rollers.

Figure 6:
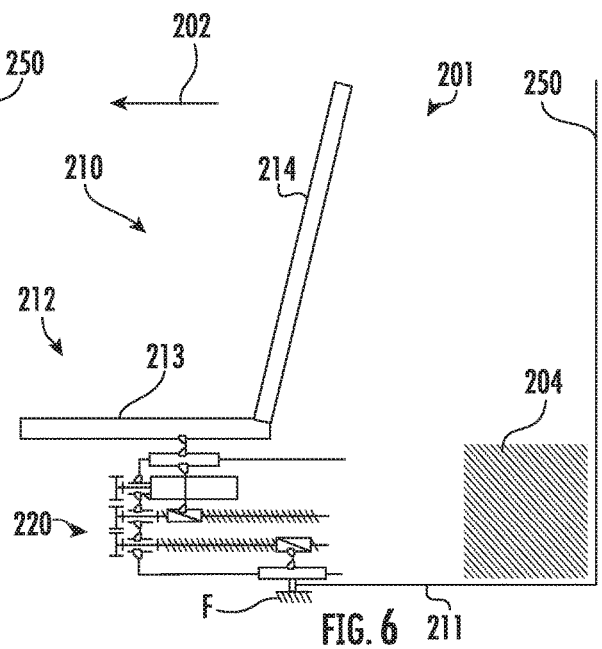
FIG. 6 shows the design schematic of the exemplary seat kinematic system of FIG. 5 when the seat is in an extended position according to some embodiments of the invention.
Figure 7:
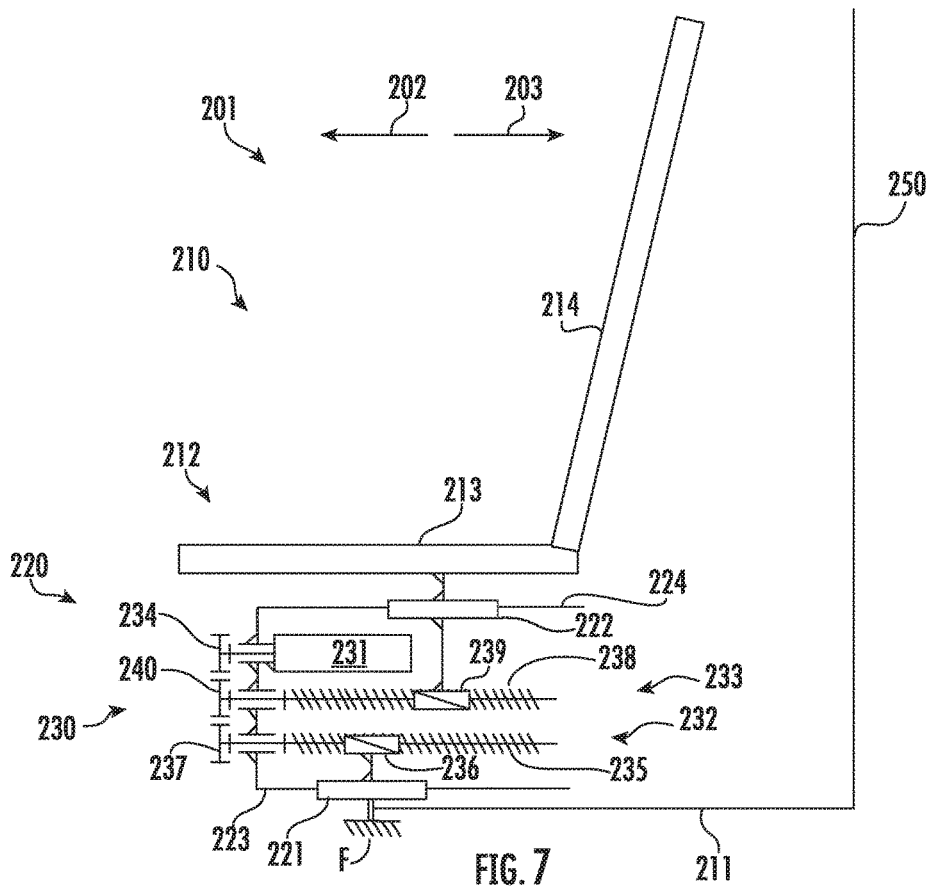
FIG. 7 shows the design schematic details of the exemplary seat kinematic system of FIG. 5 and FIG. 6.

FIGS. 5-7 illustrate a detailed schematic of some exemplary embodiments according to the present invention. FIG. 5 illustrates the system 201 when the seat 210 is in a retracted position and FIG. 6 illustrates the system 201 when the seat 210 is in an extended position. The illustrated system 201 includes a seat 210, an intermediate component 220, and a privacy wall 250. The seat 210 includes a lower frame portion 211 and an upper seat portion 212 including a seat pan 213 and a seat backrest 214 coupled with the seat pan 213, directly or indirectly via an intermediate component. The lower frame 211 may be fixed to the passenger cabin floor F and the upper seat portion 212 may translate relative to the lower frame 211 when seat 210 moves between the retracted position and the extended position. The lower frame portion 211 may couple to the upper seat portion 212 via the intermediate component 220.

The intermediate component 220 may be a seat slider motorized system and may be positioned between the lower frame portion 211 and the upper seat portion 212. The intermediate component 220 may control and coordinate the translation of the upper seat portion 212 relative to the lower frame 211. The intermediate component 220 may slideably couple to the lower frame 211 at a lower slider 221 and may slideably couple to the upper seat portion 212 at an upper slider 222. The intermediate component 220 may further include a lower guide rail 223 and an upper guide rail 224 for guiding the lower slider 221 and upper slider 222, respectively, as the seat 210 is moved between the extended position and the retracted position. The lower guide rail 223 and the upper guide rail 224 may run parallel to one another.

The intermediate component 220 may include an actuator system 230 for driving the seat 210 between the retracted and the extended position. Actuator system 230 may include a motor 231, a first linear actuator 232, and a second linear actuator 233. Motor 231 may be fixed to a portion of the intermediate component 220 and may include a motor gearwheel 234 for driving one or both of the linear actuators 232, 233.

Optionally, the first linear actuator 232 and the second linear actuator 233 may run parallel to one another. One of the linear actuators 232, 233 may rigidly couple to an upper seat portion 212 of the seat 210, while the other linear actuator rigidly couples to the lower frame portion 211 of the seat 210. Additionally, first linear actuator 232 may include a linear actuator gearwheel 237 and second linear actuator 233 may include a linear actuator gearwheel 240 for operatively coupling with the motor gearwheel 234. Accordingly, as illustrated, the first linear actuator 232 may be driven by motor 231 for slideably translating the intermediate component 220 relative to lower frame 211 and the second linear actuator 233 may be driven by motor 231 for slideably translating the upper seat portion 212 relative to the intermediate component 220.

In some embodiments, the first linear actuator 232 comprises a ball screw 235 and a corresponding ball nut 236. The ball screw 235 may include a first end and a second end and an elongate body therebetween. The elongate body of the ball screw 235 may define an axis of rotation about which the ball screw 235 rotates. As the ball screw 235 rotates about the axis of rotation, the corresponding ball nut 236 may translate along the elongate body of the ball screw 235 in a forward direction 202 or a backward direction 203 relative to ball screw 235 depending on the rotation direction of ball screw 235. The ball nut 236 may be configured to be fixed to the lower frame 211 such that the lower frame 211 translates with the ball nut 236 relative to the ball screw 235 as the ball screw 235 rotates along its axis of rotation. For example, as illustrated in FIG. 5 and FIG. 6, ball nut 236 couples to lower frame 211 via lower slider 221.

The second linear actuator 233 may also comprise a ball screw 238 and a corresponding ball nut 239. The ball screw 238 may have a first end and a second end and an elongate body therebetween. The elongate body may define an axis of rotation for ball screw 238. The ball nut 239 may translate along the elongate body of the ball screw 238 in forward direction 202 or backward direction 203 when the ball screw 238 rotates about the axis of rotation. The ball nut 239 may be configured to be fixed to the upper seat portion 212 such that the upper seat portion 212 translates with the ball nut 239 relative to the ball screw 238 as the ball screw 238 rotates along the axis of rotation. For example, as illustrated in FIG. 5 and FIG. 6, ball nut 239 may rigidly couple to upper seat portion 212 via upper slider 222. Optionally, to ensure alignment of actuator system 230, ball nut 236 and ball nut 239 may be mounted on the lower frame 211 and the upper seat portion 212, respectively, using flexible joints.

In the illustrated embodiment, gearwheel 237 couples to the first end of ball screw 235 and gearwheel 240 couples to the first end of ball screw 238. Motor gearwheel 234 directly couples with gearwheel 240 and gearwheel 237 operatively couples to motor gearwheel via gearwheel 240. In this configuration, motor 231 may be configured to drive both linear actuators 232, 233. Furthermore, in this configuration, ball screw 235 of first linear actuator 232 rotates in a direction opposite that of ball screw 238 of second linear actuator 233. Additionally, ball screw 235 and ball screw 238 may be similar in length and may have similar helical handedness. For example, as illustrated in FIG. 5 and FIG. 6, ball screw 235 and ball screw 238 are illustrated with a right-handed helical thread. Accordingly, since motor 231 drives both ball screws 235, 238 simultaneously and in opposite directions, the corresponding ball nuts 236, 239 travel in opposite directions relative to their corresponding ball screws 235, 238.

As illustrated in FIG. 5, when seat 210 is in the retracted position, ball nut 236 is proximate to the first end of ball screw 235 and ball nut 239 is proximate to the second end of ball screw 238. Additionally, ball nut 236 fixedly couples to lower frame 211 via lower slider 221 and is in a fixed position. When motor 231 drives seat 210 from the retracted position toward the extended position illustrated in FIG. 6, ball screw 235 (and coupled intermediate component 220) move in the forward direction 202 relative to fixed ball nut 236/lower frame 211 until ball nut 236 is proximate the second end of ball screw 235. Simultaneously, ball nut 239 (and coupled upper seat portion 212) move in the forward direction 202 relative ball screw 239/intermediate component 220 until ball nut 239 is proximate the first end of ball screw 238. Once in the extended position, motor 231 may be driven in the opposite direction in order to return the seat 210 from the extended position to the retracted position.

Thus, when moving between the retracted and the extend positions, intermediate component 220 may travel at a first speed in the forward and/or backward direction relative to the lower frame 211 while upper seat portion 212 travels at a second speed in the forward and/or backward direction relative to the lower frame 211—the second speed being greater than the first speed. In embodiments where ball screw 235 and ball screw 238 have similar configurations, the second speed may be twice that of the first speed.

As can be seen in FIGS. 5 and 6, space 204 between the intermediate component 220 and privacy wall 250 is not necessary for translating seat 210 from the retracted position to the extended position. Accordingly, the compact design of the illustrated embodiment may allow space 204 to have other uses, such as storage, additional components, increased footwell space for the passenger seated directly behind, etc.

While illustrated with a single motor 231, it should be understood that actuator system 230 may include more than one motor 231. For example, in some embodiments, a motor may be provided for each linear actuator 232, 233 such that the linear actuators 232, 233 may be driven individually and/or separately. In some embodiments, however, it may be advantageous to use a single motor 231 so as to provide a more compact system (and thus save space) and to possibly reduce manufacturing costs. Further, while illustrated with a motor gearwheel 234 as driving the ball screws 235, 238 in opposite directions, other embodiments may be configured with motor gearwheel 234 positioned between gearwheel 237 and gearwheel 240 such that gearwheel 237/ball screw 235 and gearwheel 240/ball screw 238 rotate in a similar orientations as motor 231 is driven. Further, in some embodiments, motor gearwheel 234 may be configured to directly couple gearwheel 237, and gearwheel 240 may couple to motor gearwheel 234 by coupling with gearwheel 237.

In other embodiments, motor 231 may drive linear actuators 232, 233 using a pulley system. For example, gearwheels 237, 240 may be coupled to one another at the first ends of their respective ball screws 235, 238. The pulley system may couple the motor 231 to one of the ball screws 235, 238. A first pulley may be coupled to the second end of one of the ball screws 235, 238 and a second pulley may be driven by motor 231. A belt may couple the first pulley to the second pulley in order to operationally couple the motor 231 to one of the ball screws 235, 238.

Additionally, while the embodiments discussed above are generally illustrated and described as using a ball screw and a corresponding ball nut as a linear actuator, it should be understood that other linear actuator configurations are possible. For example, a simple screw and nut may be used in some embodiments. Further, linear actuator 232 and linear actuator 233 have been illustrated as having similar configurations (e.g., ball screws with similar length, right-handedness, etc.), it should be understood that other embodiments may use differing linear actuators. For example, in some embodiments, one or both ball screws may have left-handed helical threads and/or differing lengths. In some embodiments, however, it may be advantageous to use similar linear actuators for both actuators 232, 233 as this may reduce costs and reduce the complexity of assembly and design. For example, using two ball screws with similar configurations (e.g., length, handedness, etc.) may reduce the number of different components in the kinematic system and thereby reduce manufacturing costs and simplify assembly.

Figure 8:
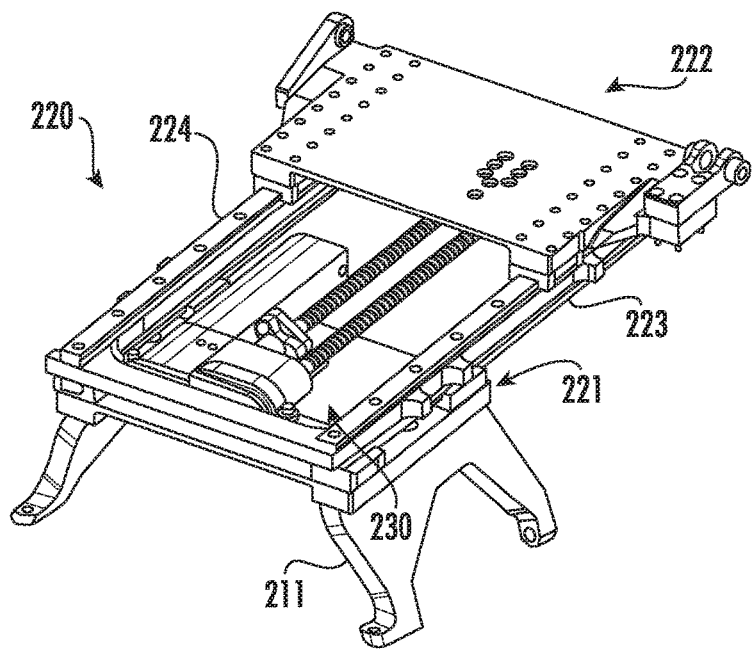
FIG. 8 shows an isometric view of components of an exemplary embodiment according to the schematics shown in FIGS. 5-7 according to some embodiments of the invention.
Figure 9:
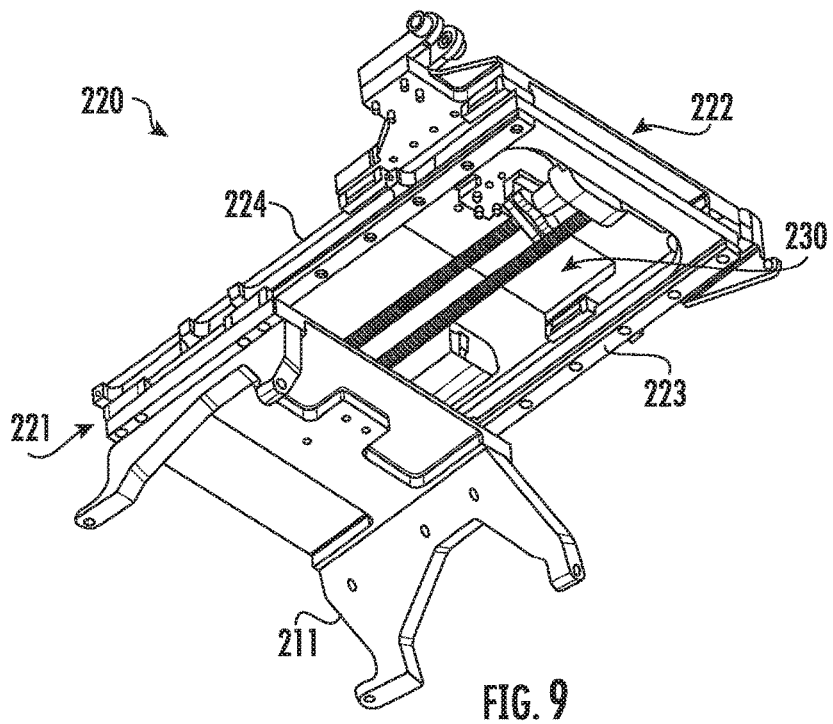
FIG. 9 shows an alternative isometric view of components of an exemplary embodiment according to the schematics shown in FIGS. 5-7 according to some embodiments of the invention.

FIGS. 8-12 show possible configurations of various components of the system 201 illustrated in FIGS. 5-7. FIG. 8 and FIG. 9 show isometric views of an exemplary lower frame 211 coupled with an exemplary intermediate component 220. As can be seen in FIG. 8 and FIG. 9, the lower frame 211 is configured to couple to the passenger cabin floor and lower slider 221 of intermediate component 220. Lower slider 221 fixedly couples to lower frame 211 and slides along lower guide rail 223. Intermediate component 220 includes upper slider 222 configured to couple with upper seat portion 212 and slide along upper guide rail 224.

Figure 10:
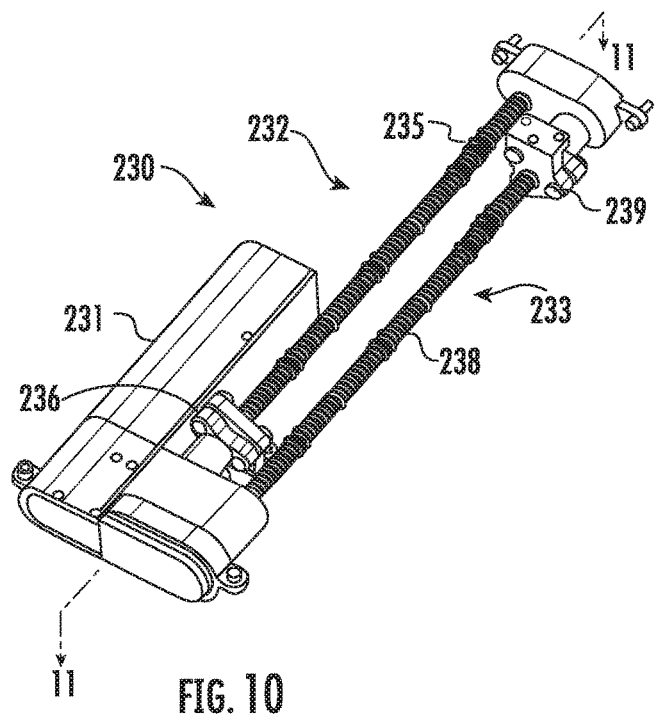
FIG. 10 shows an isometric view of the exemplary actuator system shown in FIG. 8 and FIG. 9 according to some embodiments of the invention.
Figure 11:
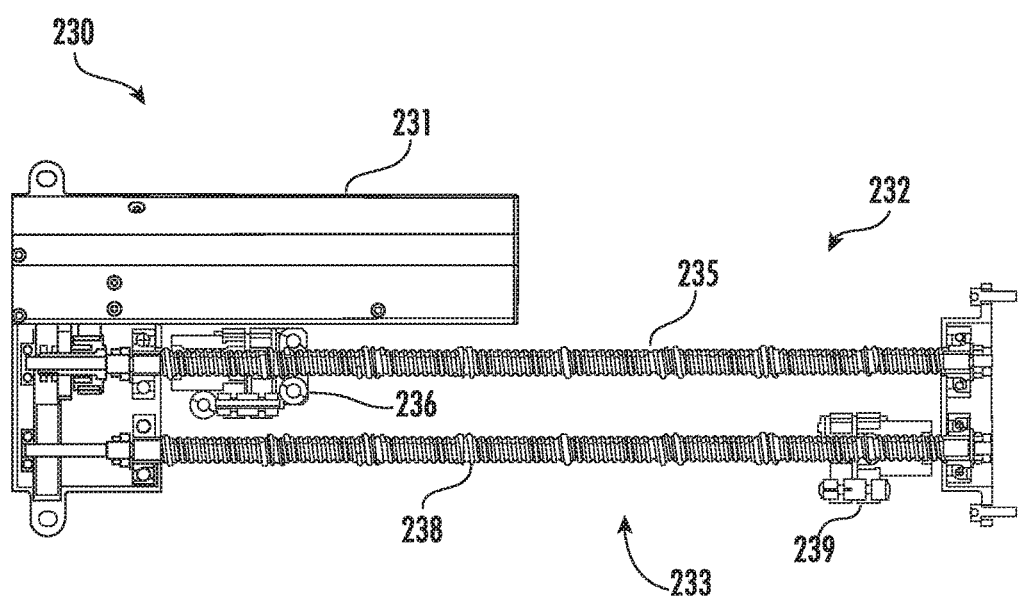
FIG. 11 shows a cross-sectional view of the exemplary actuator system shown in FIG. 10 according to some embodiments of the invention.
Figure 12:
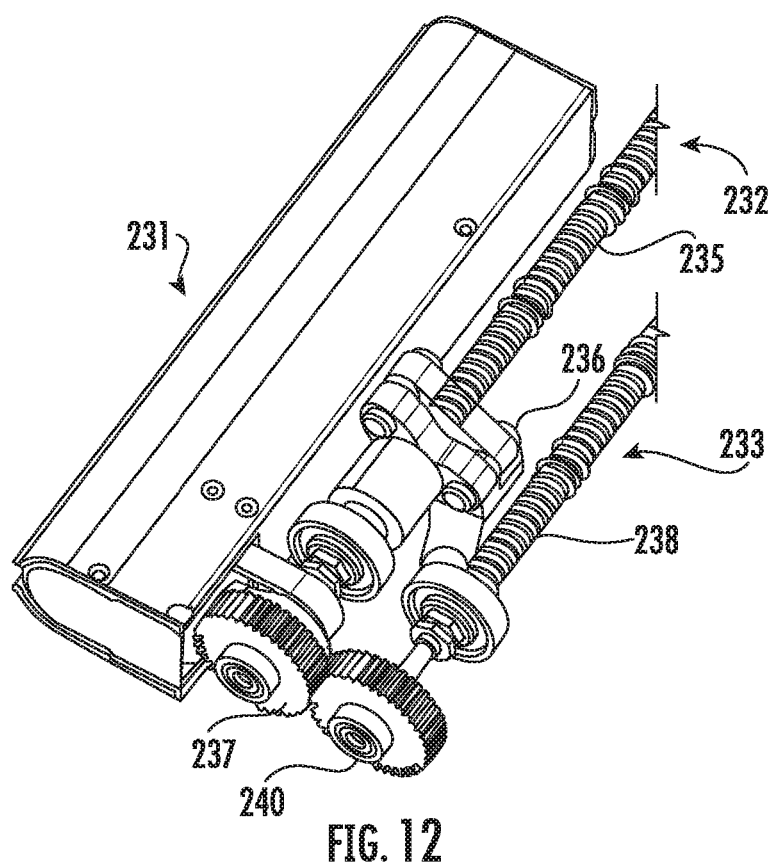
FIG. 12 shows details of a coupling between a motor, a first linear actuator, and a second linear actuator according to some embodiments of the invention.

Intermediate component 220 further includes actuator system 230, the details of which can be more easily seen in FIGS. 10-12. FIG. 10 and FIG. 11 show alternative views of actuator system 230. Actuator system 230 includes the motor 231, a first linear actuator 232, and a second linear actuator 233. The first linear actuator 232 comprises a first ball screw 235 and a corresponding ball nut 236. The ball nut 236 couples to lower frame 211 via the lower slider 221, as shown in FIG. 8. Actuator system 230 further includes a second ball screw 238 parallel to first ball screw 235 and a corresponding ball nut 239. Ball nut 239 is configured to couple to upper seat portion 212 via the upper slider 222, as shown in FIG. 9. In the retracted position, the ball nut 236 is proximal to a first end of ball screw 235 while the ball nut 239 is proximal to the second end of ball screw 238 as shown in FIG. 10 and FIG. 11. When motor 231 drives linear actuators 232, 233, the ball screws 235, 238 rotate in opposite directions. Accordingly ball nuts 236, 239 travel along their respective ball screws 235, 238 in opposite directions relative to one another.

FIG. 12 shows details of the coupling between motor 231, linear actuator 232, and linear actuator 233. Linear actuator 232 includes a gearwheel 237 and linear actuator 233 includes a gearwheel 240 coupled with gearwheel 237. Gearwheel 237 may directly couple with a motor gearwheel 234 (not shown).

While the embodiments illustrated in FIGS. 5-7 are generally described using linear actuators, other embodiments may use rotary actuators. For example, FIGS. 13-15 illustrate an intermediate component 220 comprising an alternative actuator system 330 for driving the seat 210 between the retracted position and the extended position. FIG. 13 shows the seat 210 in the retracted position and FIG. 14 shows the seat 210 in an extended position. Actuator system 330 comprises a motor 331 coupled to a pulley system 332. The pulley system 332 includes two pulleys, a front pulley 333 and a back pulley 334, horizontally spaced apart from one another and coupled to each other via a belt 335. The lower frame 211 couples to a point 336 on a lower portion of the belt 335 and the upper seat portion 212 couples to a point 337 on an upper portion of the belt 335. Belt 335 may be replaced by other systems which translate from rotation, for example, a chain, a rack, pinion system, etc.

As illustrated in FIG. 13, when seat 210 is in the retracted position, point 337 of the belt 335 may be proximal to the back pulley 334 and point 336 of belt 335 may be proximal to front pulley 333. Upper seat portion 212 may couple to point 337 via upper slider 222 an lower frame 211 may couple to point 336 via lower slider 221.

When transitioning from the retracted position illustrated in FIG. 13 toward the extended position illustrated in FIG. 14, motor 331 may drive pulley system 332 such that belt 335 rotates in a clockwise direction. When driven by motor 331, the coupling point 337 on the upper portion of belt 335 (and coupled upper seat portion 212) translates in the forward direction 202 until coupling point 337 is proximal the front pulley 333. Simultaneously, coupling point 336 remains fixed to the lower frame 221 thus translating intermediate component 220 in the forward direction 202 until coupling point 336 is proximal to the back pulley 334 as illustrated in FIG. 13. Once in the extended position, motor 331 may be driven in the opposite direction in order to return the seat 210 from the extend position to the retracted position. In the embodiments in FIG. 13-15, the intermediate component 220 moves at a first speed relative to lower frame 211 while upper seat portion 212 moves at twice the first speed relative to the lower frame 211.

While illustrated with a single motor 331, it should be understood that more motors may be used to individually drive each pulley 333, 334. Further, coupling points 336, 337 may be oppositely positioned. For example, coupling point 336 may be coupled to the upper portion of belt 335 and coupling point 337 may be coupled to a lower portion of the belt 335. Additionally, in some embodiments, pulley system 332 may be configured to drive belt 335 to rotate in a plane parallel to the floor.

Figure 16:
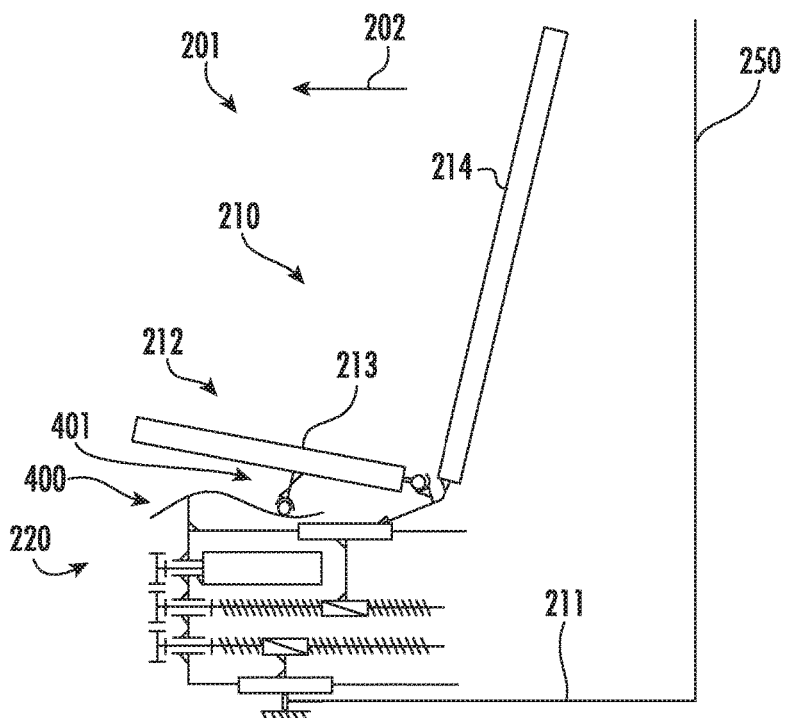
FIG. 16 shows a design schematic of an exemplary system for adjusting a seat pan angle during seat movement between a retracted position and an extended position according to some embodiments of the invention.
Figure 17:
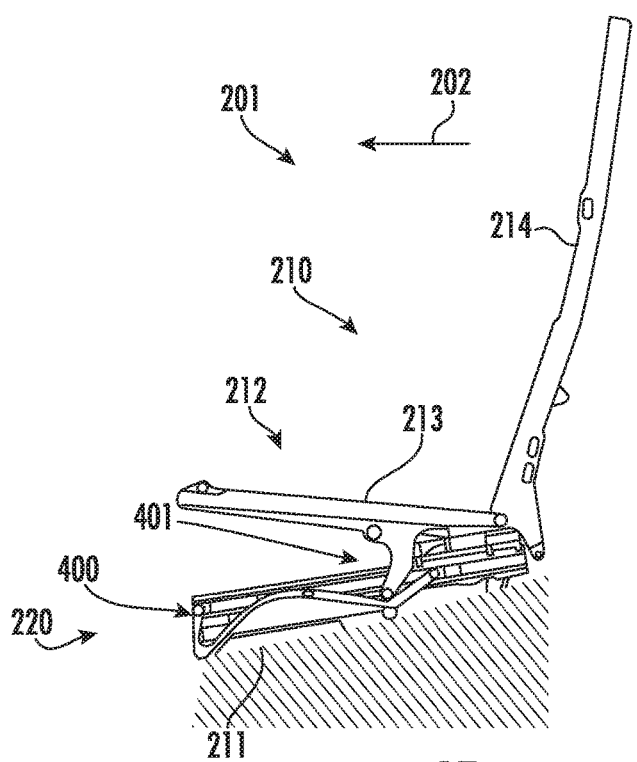
FIG. 17 illustrates an exemplary system for adjusting a seat pan angle during seat movement according to the design schematic of FIG. 16 according to some embodiments of the present invention.

The differential of speed of the intermediate component 220 may be used to activate other movement on the seat 210, such as an angle of seat pan 213, a height of one or more armrests (not shown), or movement of folding seat. For example, FIG. 16 and FIG. 17 illustrates embodiments of the present invention that may adjust the angle of seat pan 213 as the seat 210 translates between the retracted position and the extended position. As shown in FIGS. 16-17, seat pan 213 may be pivotally coupled relative to seat backrest 214 and include a roller 401 for cooperating with a track 400 that is fixedly coupled with intermediate component 220. Roller 401 maintains a spacing between seat pan 213 and track 400. Track 400 may undulate and thus modify a seat pan 213 angle as upper seat portion 212/roller 401 translate relative to intermediate component 220 and along track 400. While described and illustrated with the roller 401 coupled to seat pan 213 and track 400 coupled to intermediate component 220, it should be understood that in other embodiments, track 400 may be coupled to seat pan 213 while roller 401 couples to intermediate component 220.

Figure 18:
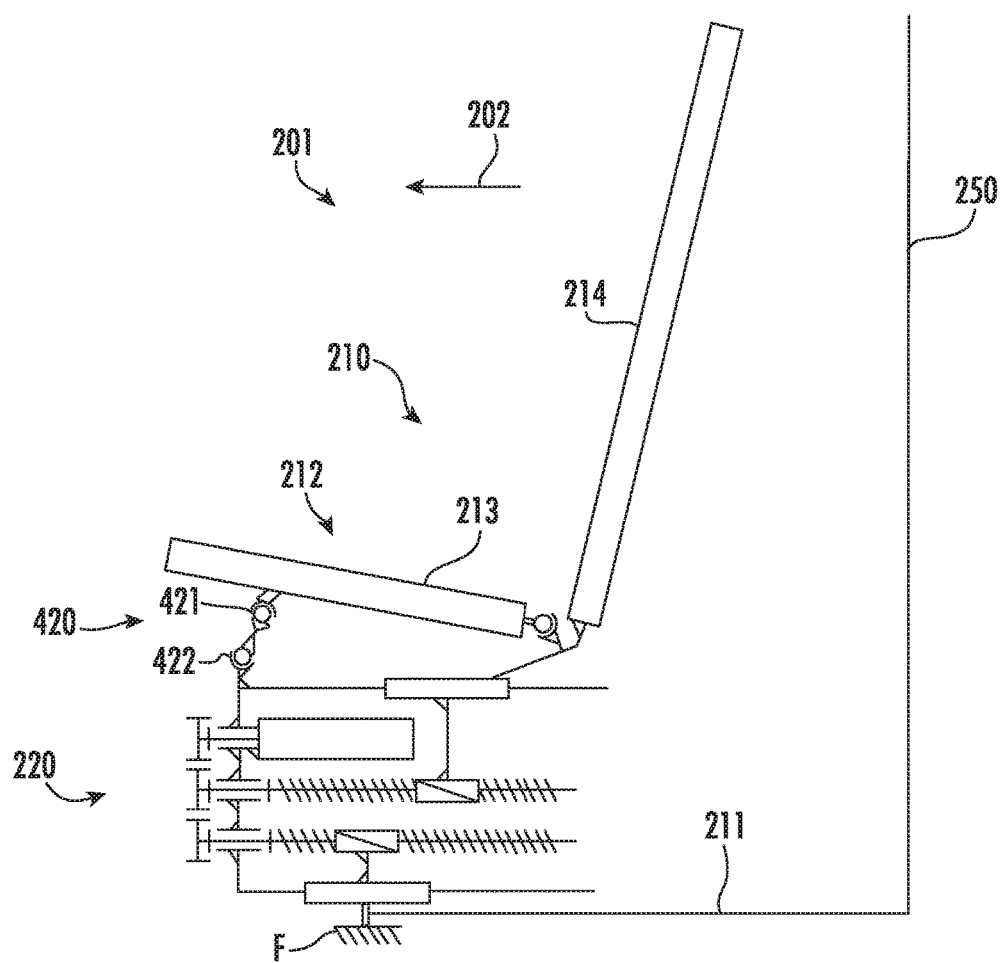
FIG. 18 illustrates an exemplary system including a linkage that may adjust an angle between the seat pan relative to an intermediate component during seat movement according to some embodiments of the present invention.

Optionally, an angle of the seat pan relative the seat kinematic may be controlled through a linkage between the seat pan and the seat kinematic. For example, as illustrated in FIG. 18, a linkage 420 may adjust an angle between the seat pan relative to the intermediate component 220. The linkage 420 may comprise a first end 421 and a second end 422. The first end 421 may be pivotally coupled to the seat pan 213 and the second end 422 may be pivotally coupled to a portion of the intermediate component 220. As the upper seat portion 212 moves relative to the intermediate component 220, the first end 421 of the link 420 may rotate about the second end 422 of the link 420 and may thus change the angle of the seat pan 213 during the relative movement between the components.

In some embodiments, it may be preferable to include a backrest recline system with a seat. Prior designs have limitations, such as the need for calibration or the inability to provide a constant ratio of speed and force. In contrast, the backrest recline system illustrated in FIGS. 19-21 may not require calibration and provides a constant ratio of speed and force and a fixed actuator. FIG. 19 shows an exemplary backrest recline system schematic when the backrest 506 is in the upright position. FIG. 20 shows the exemplary backrest recline system when the backrest 506 is in the relaxed/bed position. As shown in FIGS. 19-21, seat 503 includes a seat pan 504 and a seat backrest 506. Seat backrest 506 may be pivotally coupled relative to seat pan 504 at pivot 509 and may include a projection 507. Projection 507 may be rigid and may be actuated to move backrest 506 between the upright position and the relaxed/bed position.

Backrest recline system 510 may be coupled with the seat pan 504, directly or indirectly through an intermediate component (e.g., upper seat portion). The recline system 510 includes a motor 512 coupled to a linear actuator 514. Motor 512 may include a motor gearwheel 513 for driving linear actuator 514. Linear actuator 514 may include a gearwheel 520 for coupling with the motor gearwheel 513. Further, linear actuator 514 may comprise a ball screw 516 and a corresponding ball nut 518. The ball screw 516 has a first end and a second end and an elongate body therebetween. The gearwheel 520 may be coupled to the first end of ball screw 516. The elongate body may define an axis of rotation 517 of the ball screw 516. When driven by the motor 512, ball screw 516 rotates around the axis of rotation 517 and ball nut 518 translates along the elongate body in the forward direction 501 or backward direction 502 depending on the direction or rotation of ball screw 516. Ball nut 518 may pivotally couple with a first end of link 522. Accordingly, as ball nut 518 translates along elongate body of ball screw 516, link 522 is pushed and pulled therewith. A second end of link 522 may pivotally couple with projection 507 of seat backrest 506.

In some embodiments, it may be preferable to position the ball screw 516 such that the axis of rotation of the ball screw 516 is located lower than the pivot point 509 of the backrest 506. Additionally, in some embodiments, it may be preferable to position the pivot coupling between link 522 and projection 507 lower than the pivot point 509 of the backrest 506. Optionally, the pivot coupling between link 522 and projection 507 may be positioned rearward of a plane 509 defined by backrest 506.

As shown in FIG. 19, when backrest 506 is in the upright position, ball nut 518 is proximate to the second end of ball screw 516 and link 522 is at an angle with the axis of rotation 517 of ball screw 516. To recline the backrest 506 to the relaxed/bed position shown in FIG. 20, motor 512 may be activated to rotate ball screw 516 via gearwheels 513, 520. The rotation of the ball screw 516 translates ball nut 518 in the forward direction 501 and thus pulls link 522 therewith. As link 522 gets pulled in the forward direction 501, projection 507 is pulled by link 522 and rotates backrest 506 around pivot 509 toward the relaxed/bed position. Further, as link 522 gets pulled by ball nut 518, the link 522 may align with the axis of rotation 517 of the ball screw 516. Once in the relaxed or bed position, backrest 506 may be returned to the upright position by driving the motor 512 in the opposite direction. When rotated in the opposite direction, ball nut 518 translates in the backward direction 502 and thus pushes link 522 from linear actuator 514. As link 522 is pushed in the backward direction 502, projection 507 is pushed by link 522 and thus rotates backrest 506 around pivot 509 toward the upright position.

Figures 22, 23:
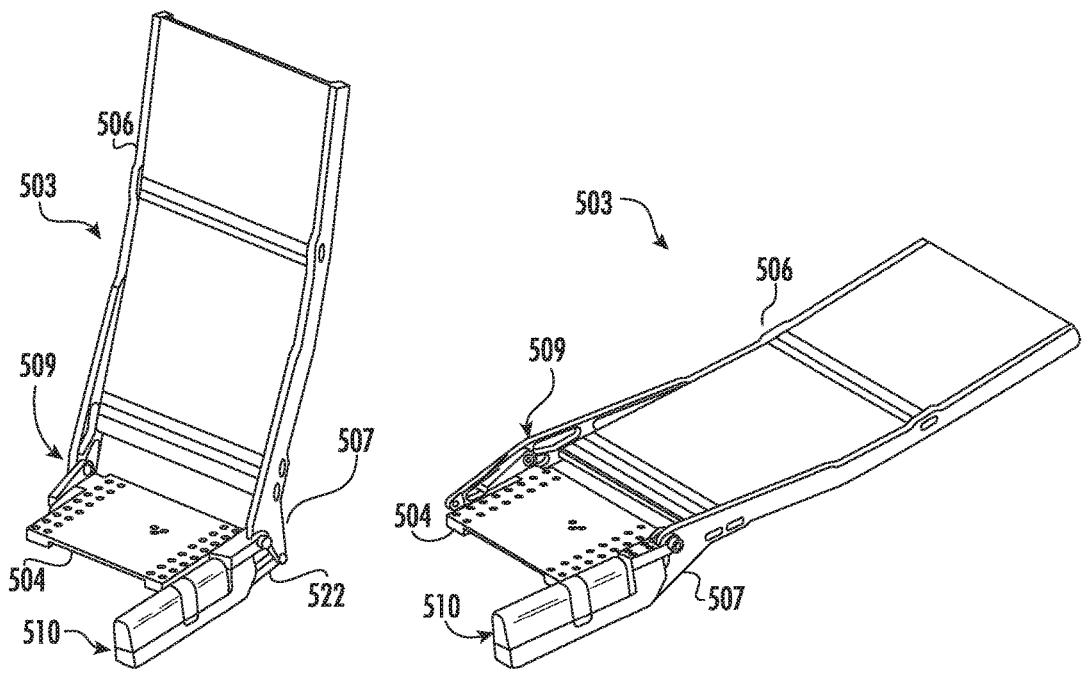
FIG. 22 shows an isometric view of seat components of an exemplary embodiment according to the design schematics shown in FIGS. 19-21.
FIG. 23 shows isometric view of the exemplary seat of FIG. 22 when the seat is in the relaxed/bed position.
Figures 24, 25:
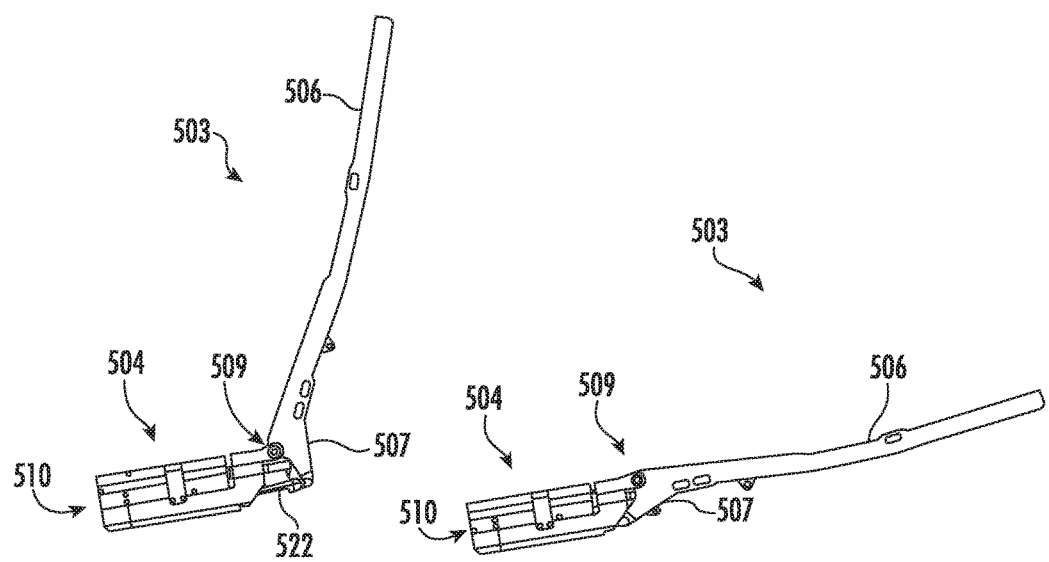
FIG. 24 shows a side view of the exemplary seat shown in FIG. 22 and FIG. 23 when the seat is in the upright position.
FIG. 25 shows a side view of the exemplary seat of FIGS. 22-24 when the seat is in the relaxed/bed position.

FIGS. 22-29 show possible configurations of various components of the system illustrated in FIGS. 19-21. FIG. 22 and FIG. 24 illustrate isometric and side views of an exemplary seat 503 when the seat 503 is in the upright position according to some embodiments of the present invention. FIG. 24 and FIG. 25 illustrate isometric and side views of the exemplary seat 503 when the seat 503 is in the relaxed/bed position. As illustrated in FIGS. 22-25, seat 503 may include seat pan 504 and seat backrest 506 pivotally coupled relative to one another, directly or indirectly through an upper seat portion. Seat backrest 506 further includes a projection 507 for coupling with the recline system 510. Recline system includes a motor 512 for driving a linear actuator 514. Details of recline system 510 and the linear actuator 514 are better seen in FIGS. 26-29.

Figure 26:
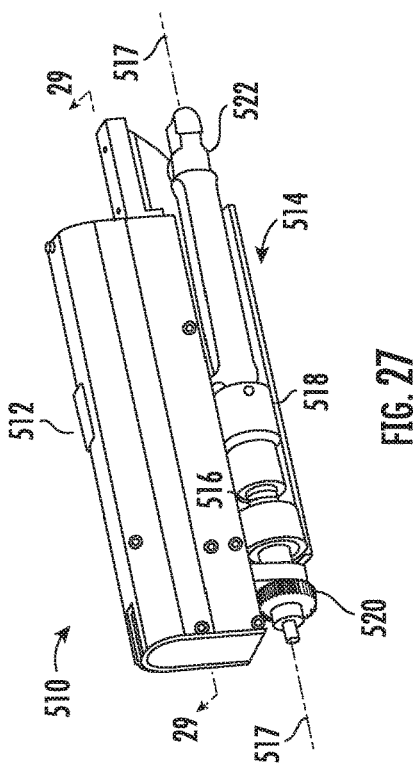
FIG. 26 shows an isometric view of an exemplary recline system when the seat is in the upright position according to some embodiments of the invention.
Figure 27:
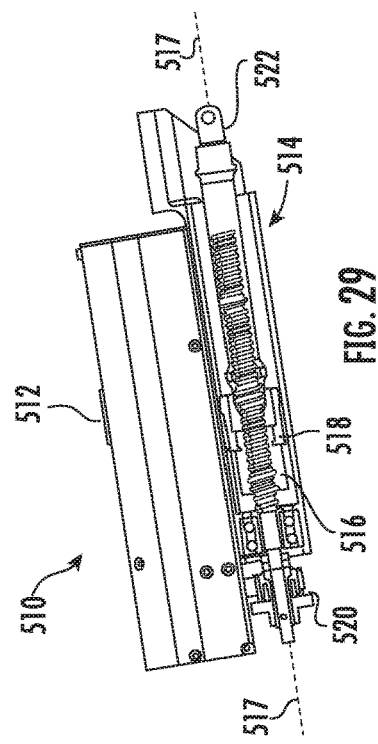
FIG. 27 shows an isometric view of an exemplary recline system when the seat is in the relaxed/bed position according to some embodiments of the invention.
Figure 28:
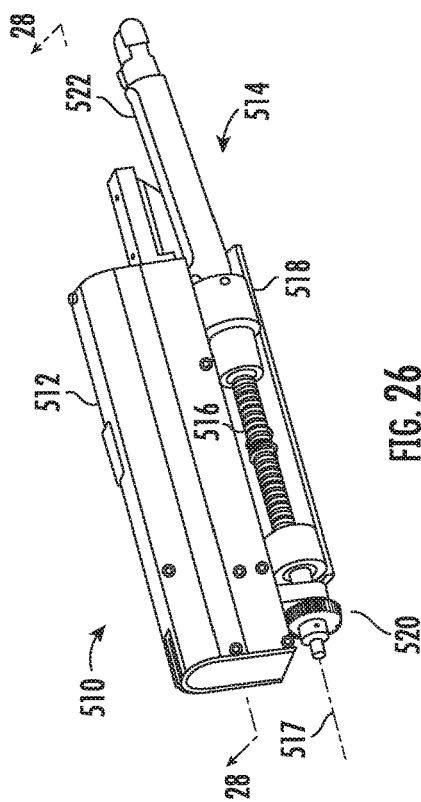
FIG. 28 shows a cross-sectional side view of the exemplary recline system FIG. 26 according to some embodiments of the invention.
Figure 29:
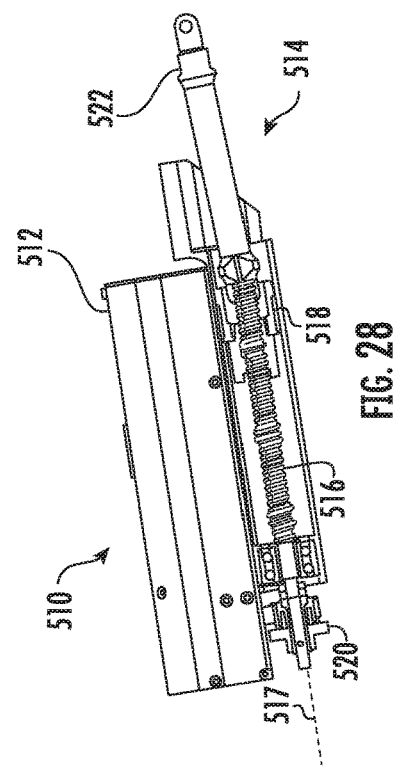
FIG. 29 shows a cross-sectional side view of the exemplary recline system of FIG. 27 according to some embodiments of the invention.

FIG. 26 and FIG. 28 provide isometric and side views of the exemplary recline system 510 when the seat 503 is in the upright position. FIG. 27 and FIG. 29 provide isometric and side views of the exemplary recline system 510 when the seat 503 is in the relaxed/bed position. As can be seen in FIG. 26 and FIG. 28, when in the upright position ball nut 518 is proximate to the second end of ball screw 516. Additionally, link 522 is pivotally coupled to ball nut 518 and extends outward from the linear actuator 514 at an angle relative to the axis of rotation 517 of the ball screw 516. When ball nut 518 is retracted toward the first end of the ball screw 516, link 522 is pulled therewith and aligns with the axis of rotation of ball screw 518. Further, when coupled to projection 507 of backrest 506, link 522 rotates backrest 506 about pivot 509 toward the bed position. Link 522 may be partially hollow so as to accommodate the ball screw 518 when the backrest 506 is moved toward the relaxed/bed position.

The exemplary system may be configured to provide a fixed actuator and a constant ratio of speed and force. Additionally, the exemplary system does not need calibration. For example, in some embodiments, a rotative limiter may be placed between the ball screw 516/ball nut 518 and the fixed frame of the recline system to avoid losing calibration between the motor 512 and the ball screw 516/ball nut 518. While illustrated and described as using gearwheels for driving the linear actuator 514, other systems may be used. For example, a motor pulley may drive a pulley coupled to the linear actuator 514 via a belt or chain running between the pulleys.

Figure 30:
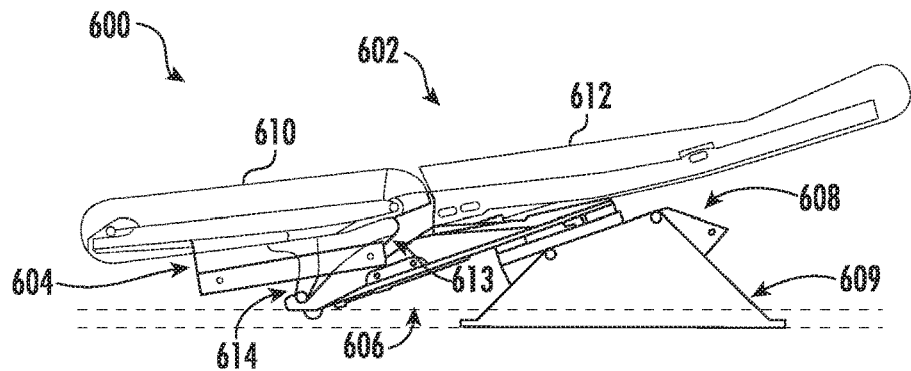
FIG. 30-32 show an exemplary system for adjusting an angle and a height of a seat in a bed position.
Figure 31:
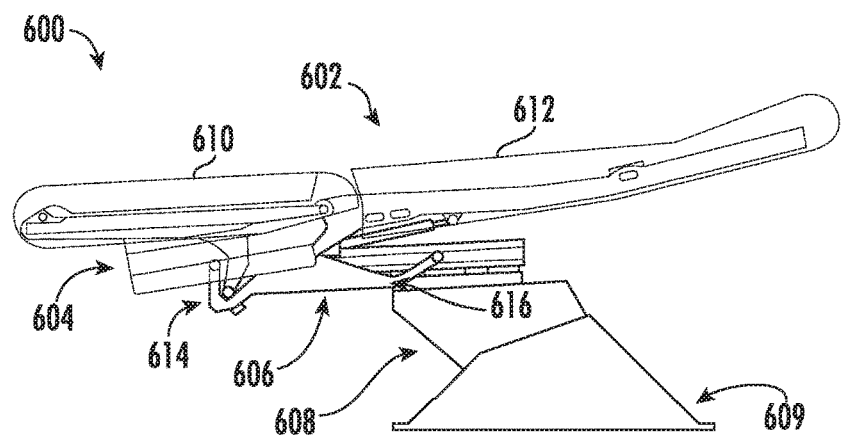
Figure 32:
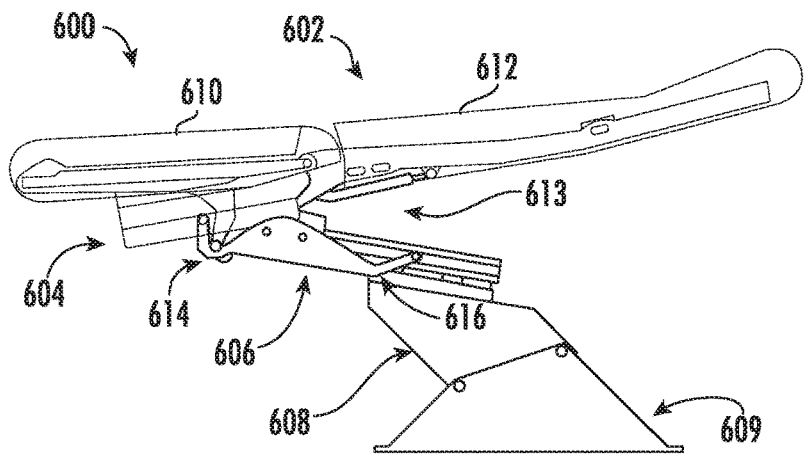

In further embodiments, it may be preferable to provide a seat assembly that may transition from an upright position to a relaxed/bed position and that wherein an angle and a height of the seat in the bed position may be adjustable. FIGS. 30-32 illustrated an exemplary embodiment where an angle and a height of the bed may be user adjustable. As illustrated in FIGS. 30-2, Seat assembly 600 includes seat 602, a backrest recline system 604, an intermediate component 606, an angle and height adjustment system 608, and a lower seat frame 609. Seat 602 includes a seat pan 610 and a seat backrest 612 moveable to a relaxed/bed position. The backrest 612 may include projection 613 for coupling with the backrest recline system 604. The backrest recline system 604 may be coupled to the seat pan 602 and may be configured to move the seat backrest 612 between the upright position and the relaxed/bed position. Optionally the backrest recline system 604 may have the design illustrated in FIGS. 19-21 or may be the embodiment shown in FIGS. 22-29. Intermediate component 606 may pivotally couple to seat pan 610. Intermediate component 606 may be a tracking system for moving seat 602 between a retracted position and an extended position. Further, as illustrated, seat pan 610 includes a roller 614 for coupling with a track 616 of intermediate component 606. Accordingly, the seat pan 610 angle may be adjusted as the seat pan 610 moves relative to the intermediate component 606. Optionally, intermediate component 606 may be configured according to the design shown in FIG. 3 and FIG. 4, and may be configured according to the design shown in FIGS. 5-7 or FIGS. 13-15. For example, the intermediate component 606 may be the intermediate component shown in FIGS. 8-12. An angle and height adjustment component 608 may couple to and between intermediate component 606 and lower frame 609. The adjustment component 608 may be configured to adjust an angle or a height of the seat 602 relative to lower frame 609. For example, as illustrated, adjustment component 608 may rigidly couple to intermediate component 606 and rotatably couple with lower frame 609. As adjustment component 608 rotates about lower frame 609, a height of the seat 602 may be raised or lowered. Further, intermediate component 606 may rotatably couple to seat pan 610 and optionally compensates for angle changes to the seat 602 to maintain the seat 602 in a relaxed/bed position.

Different arrangements of the components depicted in the drawings or described above, as well as components and steps not shown or described are possible. Similarly, some features and sub-combinations are useful and may be employed without reference to other features and sub-combinations. For example, a seat pan and a backrest may be both attached an upper portion of the seat, and may have independent motion systems (e.g., extension/retraction system and/or recline system). The seat pan angle may be adjusted using a track and roller system, or a linkage, and its angle may be linked to the position of the upper portion of the seat relative to the intermediate part of the seat. For the backrest, multiple options are available. For example, a backrest may be fully independent using a specific actuator for controlling its angle. Optionally, a backrest may be coupled to the seat pan kinematic, and in that case the backrest motion may be coupled to the position of the upper portion of the seat relative to the intermediate component, which also may drive the seat pan angle. Thus, the backrest angle may be coupled to a seat pan angle in some embodiments. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A seat kinematic for use with a seat having a lower frame portion and an upper seat portion and being moveable between a retracted position and an extended position, the seat kinematic configured to translate the upper seat portion relative to the lower frame portion when the seat transitions between the retracted position and the extended position, the seat kinematic comprising:
   an actuator system comprising a first linear actuator, a second linear actuator, and at least one motor configured to drive the first linear actuator and the second linear actuator, the first linear actuator and the second linear actuator being parallel to each other;
   wherein the actuator system is configured to couple the lower frame portion of the seat to the upper seat portion of the seat; and
   wherein the actuator system is configured to move the seat between the retracted position to the extended position by:
   1) translating the actuator system in a first direction relative to the lower frame portion by driving the first linear actuator using the at least one motor; and
   2) translating the upper seat portion in the first direction relative to the actuator system by driving the second linear actuator using the at least one motor.

2. The seat kinematic of claim 1, wherein the at least one motor is configured to simultaneously drive the first linear actuator and the second linear actuator such that the actuator system translates in the first direction relative to the lower frame portion simultaneously as the upper seat portion translates in the first direction relative to the actuator system.

3. The seat kinematic of claim 2, wherein the actuator system translates at a first speed in the first direction relative to the lower frame portion and wherein the upper seat portion translates at a second speed in the first direction relative to the lower frame portion, the second speed being greater than the first speed.

4. The seat kinematic of claim 3, wherein the second speed is at least twice that of the first speed.

5. The seat kinematic of claim 1, wherein the first linear actuator couples with the lower frame portion of the seat, and wherein the second linear actuator couples with the upper seat portion of the seat.

6. The seat kinematic of claim 1, wherein the first linear actuator comprises a first screw and a first nut, the first nut configured to rigidly couple with the lower frame portion of the seat; and wherein the second linear actuator comprises a second screw and a second nut, the second nut configured to rigidly couple with the upper seat portion of the seat.

7. The seat kinematic of claim 6, wherein the first screw comprises a first ball screw, the first nut comprises a first ball nut, the second screw comprises a second ball screw, and the second nut comprises a second ball nut; and
   wherein the first ball screw and the second ball screw are similar in length.

8. The seat kinematic of claim 7, wherein the first ball screw comprises a gearwheel coupled to a first end of the first ball screw and the second ball screw comprises a gearwheel coupled to a first end of the second ball screw; and wherein the gearwheels of the first and second ball screws are coupled together and configured to be driven simultaneously by a gearwheel of the at least one motor.

9. A seat comprising the seat kinematic of claim 8, wherein the upper seat portion of the seat comprises a seat pan and a seat backrest;
   wherein the seat kinematic further comprises a track coupled to the actuator system;
   wherein a seat pan couples to the track with a roller, the roller configured to roll along the track as the upper seat portion translates relative to the actuator system; and
   wherein an angle of the seat pan changes as the roller rolls along the track as the upper seat portion translates relative to the actuator system.

10. A seat comprising the seat kinematic of claim 8, and wherein, when the seat is in the retracted position, the first ball nut is adjacent the first end of the first ball screw and the second ball nut is adjacent a second end of the second ball screw, the second end of the second ball screw being opposite the first end of the second ball screw.

11. A seat comprising the seat kinematic of claim 1, wherein the upper seat portion of the seat comprises a seat pan and a seat backrest; wherein the seat further comprises a backrest recline system, the backrest recline system comprising:
   at least one motor coupled to a linear actuator, the at least one motor and the linear actuator coupled to the seat pan;
   a link having a first end and a second end and an elongate body therebetween, the first end of the link pivotally coupled to the linear actuator and the second end of the link coupled to the seat backrest.

* * * * *